Aug. 8, 1933.  W. SCHOPPER  1,921,706
PROCESS FOR THE PRODUCTION OF PURE ARSENIOUS OXIDE FROM ARSENICAL PRODUCTS
Filed Nov. 12, 1930  2 Sheets-Sheet 2
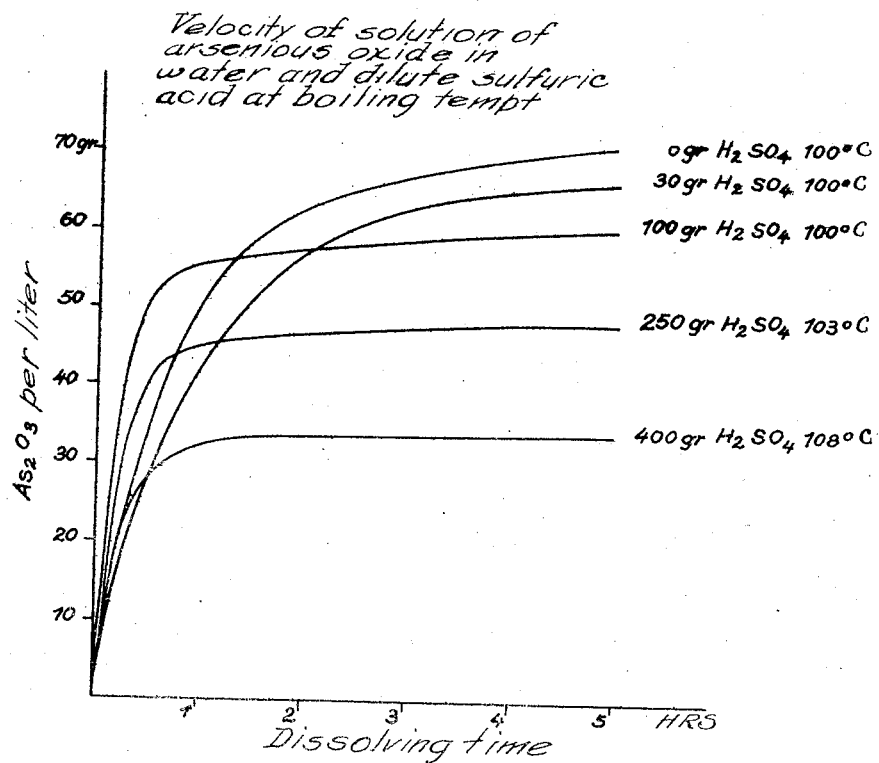
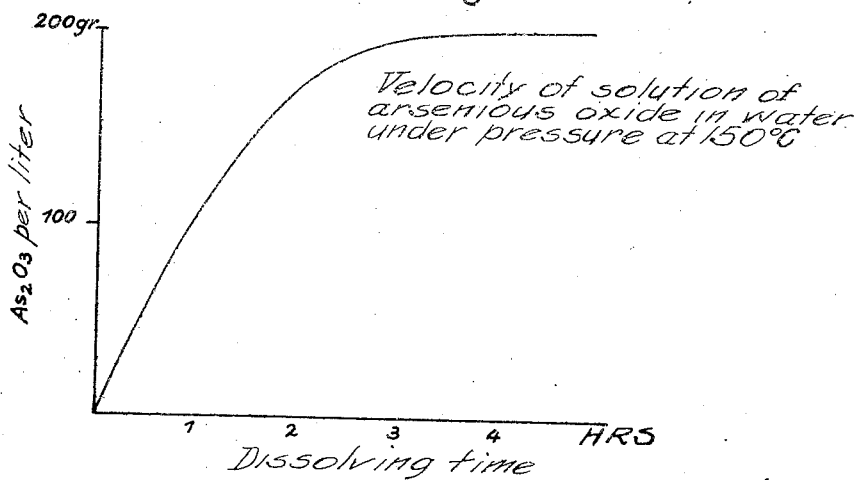

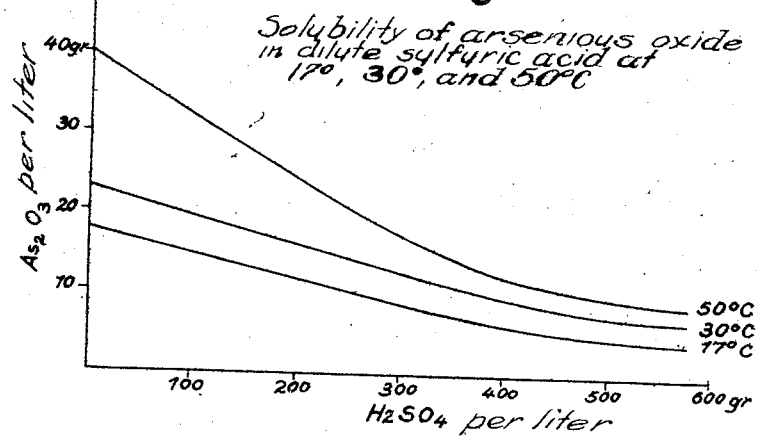
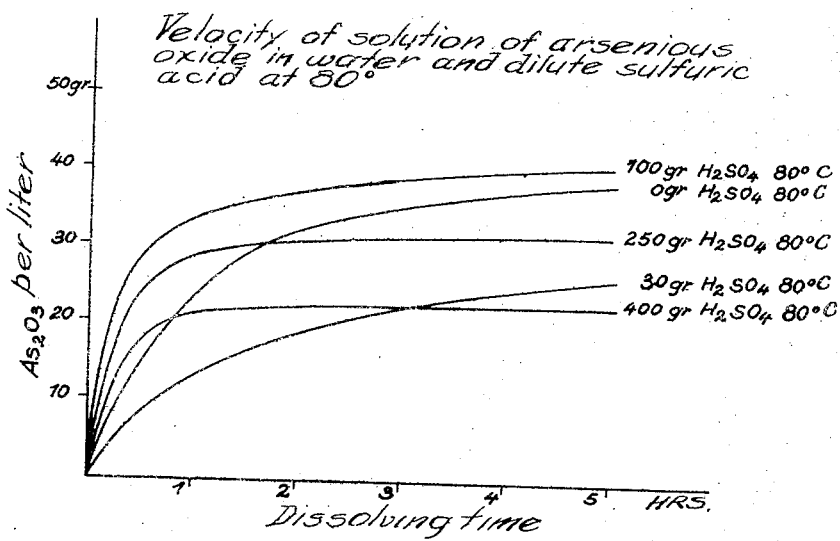

Patented Aug. 8, 1933

UNITED STATES PATENT OFFICE 1,921,706

PROCESS FOR THE PRODUCTION OF PURE ARSENIOUS OXIDE FROM ARSENICAL PRODUCTS

Walter Schopper, Hamburg, Germany

Application November 12, 1930, Serial No. 495,266, and in Germany November 26, 1929

10 Claims. (Cl. 23—144)

This invention relates to a process for the production of pure arsenious oxide from arsenical products, such as crude arsenical flue dust, containing arsenic in the form of arsenious oxide.

The processes hitherto known for refining crude arsenical flue dust utilize the volatility of arsenious oxide at high temperatures. According to these processes, the arsenious oxide is expelled, in roasting or muffle furnaces, by the application of extraneous heat, and is then condensed, by cooling the furnace gases, being finally deposited in dust chambers or also by electrical gas purification. These processes are attended with the drawback of producing large quantities of highly arsenical dust which is dangerous to the health of the operators. Moreover, the refining of the crude arsenious oxide by volatilization is only imperfectly effected when the crude oxide contains antimony, a portion of which, in such case, passes over with the refined arsenious oxide and reduces its value. Furthermore, when antimony is present, a considerable portion of the arsenious oxide must be left behind in the residue, since otherwise the bulk of the antimony also passes over, and products, which are also unsaleable, are obtained.

According to the process of the present invention, these difficulties are overcome in that the production of the arsenious oxide, in the pure state, from products (such as crude arsenical flue dust) containing same, is effected by recrystallization from aqueous solution for example from solution in dilute sulphuric acid, instead of volatilization as heretofore. Little has hitherto been known about the solubility of arsenious oxide in water. In the well-known Solubility Tables of Landolt-Börnstein (5th Edition), the solubility values for $As_2O_3$ are not given above the temperature of 39.8° C. Consequently, applicant first made a more thorough investigation into the solubility of arsenious oxide, the result of which research is plotted as curves in Figs. 1, 2 and 3. Fig. 1 gives the solubility of arsenious oxide at temperatures of 17°, 30° and 50° C., Fig. 2 the rate of solution at 80° C., and Fig. 3 the rate at the boiling point of the solution. The curves were determined by keeping an excess of arsenious oxide stirred in the solvent employed, and ascertaining the increased amount of dissolved arsenious oxide in samples drawn from time to time. The water lost by evaporation was continuously replenished.

A comparison of the three diagrams reveals that the arsenious oxide can be recrystallized, even by dissolving it at boiling heat and recooling the hot-saturated aqueous or sulphuric acid solution. It was, however, also ascertained that the solubility of arsenious oxide is very largely increased by treating it with the solvents at temperatures above the boiling point of water, that is, by heating under pressure. For example, at 150° C.—corresponding to a pressure of 5 atmospheres—arsenious oxide can be dissolved in water to an extent corresponding to a concentration of 200 grms. of $As_2O_3$ per litre. The rate of solution of arsenious oxide in water at 150° C. is shown in Fig. 4.

Based on this discovery, the process of the present invention consists in extracting the arsenious oxide from crude arsenical powder, or other substances or mixtures containing arsenious oxide, by means of aqueous liquids, at ordinary or elevated temperature—preferably at temperatures above 100° C., and for example, at about 150° C.—and then effecting its deposition, in crystalline form, by cooling, after concentration if necessary. According to the kind of originating material treated, the solvent may consist of water, or of dilute acid (preferably sulphuric acid), or also, in some cases, of a weak solution of alkali, containing for example 2 grms. of free caustic soda per litre.

For example, the originating arsenical material is heated with water, in an autoclave, at a temperature of 150° C., for several hours under pressure and with stirring, by which means a highly concentrated solution of arsenious oxide is obtained. This solution is separated from the undissolved residue, for example in a filter press. On cooling, the arsenious oxide separates out, in a highly pure state, with a content of 99.5% of $As_2O_3$ and over.

It has also been ascertained that arsenious oxide displays an unusual tendency to form supersaturated solutions. Thus, for example, a solution containing 75 grms. of arsenious oxide per litre, remains limpid for 24 hours, in spite of thorough cooling, without manifesting any tendency to deposit $As_2O_3$ crystals. A solution containing 100 grms. of $As_2O_3$ per litre can be cooled down to normal temperature without crystallizing, and not until several hours have elapsed does the $As_2O_3$ begin to crystallize out gradually, the operation being, moreover, incomplete even after a period of days or weeks. Experiments have now revealed that the difficulties opposing the crystallization of the $As_2O_3$ can be overcome by bringing the solution, which is in course of crystallization, into contact with considerable quantities of arsenious oxide preferably in a finely divided state and by stirring for several hours. As a rule it is advisable, in such case, to add an amount of $As_2O_3$ which is not much smaller than that intended to be crystallized out. The retardation of crystallization diminishes as the content of free sulphuric acid in the liquor increases.

The process according to the invention has been found specially applicable for the treatment of arsenical flue dust containing antimony. In presence of arsenious oxide, the solubility of antimonious oxide in water at 150° C. amounts only up to 0.45 grm. of $Sb_2O_3$ per litre, whilst the cooled solution is still able to retain 0.25 grm. per litre in the dissolved state. Consequently, the presence of antimonious oxide does not affect the refining of arsenious oxide by the process of the present invention.

The originating materials, such as arsenical flue dust, sometimes contain soluble organic substances which, in part, become associated with the arsenious oxide which crystallizes out, and stain it yellow. In such cases, in order to obtain a pure white product, it is advisable to stir up the hot-saturated $As_2O_3$ solution, prior to crystallization, with superficially active substances, such as finely ground active carbon, filter, and not allow the $As_2O_3$ to crystallize out until this has been done.

I claim:—

1. Process for the recovery of arsenious oxide from substances containing the same, comprising extracting the arsenious oxide from the originating material by treating the latter with an aqueous liquid containing no more alkaline reacting substance than is represented by 2 grams of free alkali hydroxide per liter at a temperature above the normal boiling point of the liquid and at a superatmospheric pressure corresponding to said temperature, and depositing the arsenious oxide from the resulting solution by crystallization.

2. Process for the recovery of arsenious oxide from substances containing the same, comprising extracting the arsenious oxide from the originating material by treating the latter with water at a temperature above the normal boiling point of the liquid and at a superatmospheric pressure corresponding to said temperature, and depositing the arsenious oxide from the resulting solution by crystallization.

3. Process for the recovery of arsenious oxide from substances containing the same, comprising extracting the arsenious oxide from the originating material by treating the latter with acidulated water at a temperature above the normal boiling point of the liquid and at a superatmospheric pressure corresponding to said temperature, and depositing the arsenious oxide from the resulting solution by crystallization.

4. Process for the recovery of arsenious oxide from substances containing the same, comprising extracting the arsenious oxide from the originating material by treating the latter with a mixture of water and sulphuric acid at a temperature above the normal boiling point of the liquid mixture and at a superatmospheric pressure corresponding to said temperature, and depositing the arsenious oxide from the resulting solution by crystallization.

5. Process for the recovery of arsenious oxide from substances containing the same, comprising extracting the arsenious oxide from the originating material by treating the latter with an aqueous liquid containing no more alkaline reacting substance than is represented by 2 grams of free alkali hydroxide per liter at a temperature above the normal boiling point of the liquid and at a superatmospheric pressure corresponding to said temperature, and depositing the arsenious oxide from the resulting solution by cooling the same.

6. Process for the recovery of arsenious oxide from substances containing the same, comprising extracting the arsenious oxide from the originating material by treating the latter with an aqueous liquid containing no more alkaline reacting substance than is represented by 2 grams of free alkali hydroxide per liter at a temperature above the normal boiling point of the liquid and at a superatmospheric pressure corresponding to said temperature, and depositing the arsenious oxide from the resulting solution by crystallization, subsequent to the addition of solid arsenious oxide in comparatively large amount to said solution.

7. Process for the recovery of arsenious oxide from substances containing the same, comprising extracting the arsenious oxide from the originating material by treating the latter with an aqueous liquid containing no more alkaline reacting substance than is represented by 2 grams of free alkali hydroxide per liter at a temperature above the normal boiling point of the liquid and at a superatmospheric pressure corresponding to said temperature, and depositing the arsenious oxide from the resulting solution by crystallization, subsequent to the addition, with stirring, of solid arsenious oxide in comparatively large amount to said solution.

8. Process for the recovery of arsenious oxide from substances containing the same, comprising extracting the arsenious oxide from the originating material by treating the latter with an aqueous liquid containing no more alkaline reacting substance than is represented by 2 grams of free alkali hydroxide per liter at a temperature above the normal boiling point of the liquid and at a superatmospheric pressure corresponding to said temperature, and depositing the arsenious oxide from the resulting solution by crystallization, after decoloration of said solution with a decolorizing medium.

9. Process for the recovery of arsenious oxide from crude arsenical flue dust containing arsenious oxide and antimony, comprising extracting the arsenious oxide from the flue dust by treating the latter with an aqueous liquid containing no more alkaline reacting substance than is represented by 2 grams of free alkali hydroxide per liter at a temperature above the normal boiling point of the liquid and at a superatmospheric pressure corresponding to said temperature, and separating the arsenious oxide from the resulting solution by crystallization in a directly marketable form by virtue of its purity, its intense white color and its high specific gravity.

10. Process for the recovery of arsenious oxide from metallurgical intermediate and waste products containing arsenious oxide and antimony and considerable quantities of mineral and other constituents, comprising extracting the arsenious oxide from the originating material by treating the latter with an aqueous liquid at a temperature above the normal boiling point of the liquid and at a superatmospheric pressure corresponding to said temperature, and separating the arsenious oxide from the resulting solution by crystallization in a directly marketable form by virtue of its purity, its intense white color and its high specific gravity.

WALTER SCHOPPER.